Aug. 7, 1945.  F. A. CARPENTER  2,380,924
SELF-PRIMING PUMPING SYSTEM
Filed Oct. 26, 1943

Inventor
Fred A. Carpenter
By Philip A. Friedell
Attorney

Patented Aug. 7, 1945

2,380,924

UNITED STATES PATENT OFFICE 2,380,924

SELF-PRIMING PUMPING SYSTEM

Fred A. Carpenter, Berkeley, Calif., assignor to Berkeley Pump Company, Berkeley, Calif., a copartnership Application October 26, 1943, Serial No. 507,748

3 Claims. (Cl. 103—113)

This invention, an automatic water system, is an improvement over existent systems in the fact that there are fewer parts, it is far more economical to build and install and has a lesser number of connections, requires less space, and installation is simple and convenient to carry out.

This new system eliminates the conventional discharge, priming and air separation chamber which is interposed between the pump and the pneumatic tank, the functions of the chamber being transferred to the pneumatic tank.

The objects and advantages of the invention are as follows:

First, to provide an automatic water system of the utmost simplicity and with a minimum number of parts and connections.

Second, to provide a system as outlined which, because of its simplicity, is very easy to install and which requires a minimum amount of space.

Third, to provide a system as outlined which is adaptable to either, self-priming alone, or self-priming coupled with pressure boosting.

Fourth, to provide a system as outlined in which the pneumatic pressure tank simultaneously functions as the storage chamber for the water which has been pumped, as the air separator, and as the priming chamber, thereby dispensing with the conventional interposed unit.

Fifth, to provide a system as outlined in which a special connection is used between the pump and the pneumatic tank and which connection will simultaneously function as a discharge connection between the pump and the tank, and as an intake connection from the tank for delivering water from the pressure tank to the pump for priming or pressure boosting.

Sixth, to provide a special connection for connecting a centrifugal pump having a discharge passage and a booster or priming passage to a pressure tank and in which connection two passages are provided at different elevations for communication between the passages in the pump and the interior of the tank.

Seventh, to provide a special connection as outlined with a diametric partition extending throughout its length to form the two passages with the partition in a horizontal plane and with the passage formed above the partition functioning as the discharge passage, and the one below the partition functioning as the priming or booster passage, with one end of the connection directly connectible to the pressure tank, and the other end directly connectible to the pump.

Other objects and advantages of the invention will become apparent as the following description is read on the accompanying drawing, in which.

Figure 3:
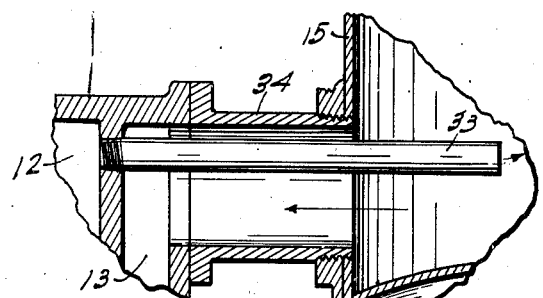
Fig. 3 is a modified form of connection for connecting the pump to the pressure tank, in which two separate connections are used, one within the other.

The invention consists essentially of the combination of a centrifugal pump 10 having an intake 11, a discharge passage 12, a priming or booster passage 13, and driving means such as a motor 14; a pressure storage tank 15; and a connection 16 having two passages connecting respectively with the discharge and priming passages of the pump and with the interior of the tank, and connecting the pump directly to the tank. In conventional pumping systems, a combined air-separating, discharge and priming chamber is interposed between the pump and the tank. It is this equipment which has been eliminated through the use of the special connection directly connecting the pump to the pressure tank, and the relative arrangement of the passages therein.

Figure 1:
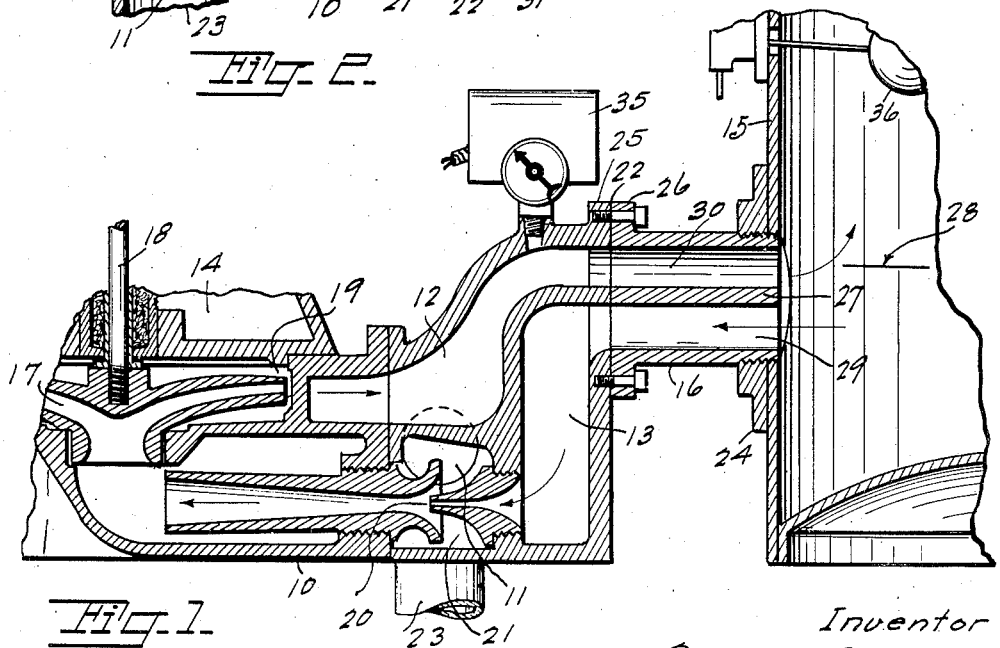
Fig. 1 is a sectional elevation through the invention fragmentarily illustrating the pump and the storage or pressure tank, and including the self-priming and booster system.

The pump 10 has an impeller 17 supported and driven by the motor shaft 18, a discharge chamber 19 connecting with the discharge passage 12, and a priming or booster passage 13. As illustrated in Fig. 1, a hydro-jet 20 is installed in the intake and priming chamber 21, while in Fig. 2, a control valve 22 is substituted for the hydro-jet and controls the flow of water from the priming passage to the intake and priming chamber.

Figure 2:
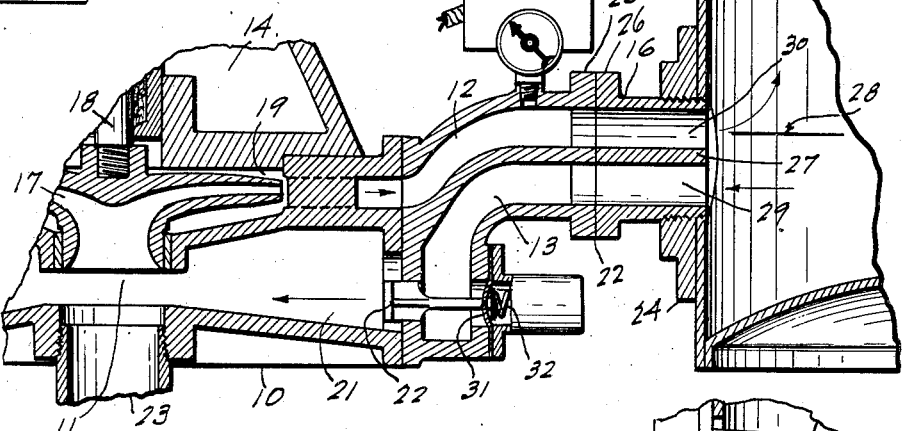
Fig. 2 is a sectional elevation similar to Fig. 1 except that it is a modification in which the booster is omitted and a priming-control valve substituted therefor.

In Fig. 1, when water in the tank 15 is at or about atmospheric pressure, the priming water merely flows through the jet 20, but as the pressure builds up in the tank, the water is forced through this jet, thus converting gradually from priming to pressure boosting. In Fig. 2, the flow of water is controlled by the valve in accordance with the existent pressure in the tank, and serves only for keeping the pump primed.

Referring to Fig. 1. There are two units, directly connectible which make up the pumping system. The pump unit includes the motor or driving means 14, the pump 10 which includes all elements up to the face 22 and the suction line 23 which is provided with the conventional check or foot valve which is not shown because it is well known in the art and is standard equipment. The tank unit includes the tank 15 with the connection 16 secured in place, and any desired water supply lines, not shown.

The pump unit is first mounted in place, after which the tank is located with the flange 26 against the flange 25, the flanges being bolted together as indicated. This completes the installation, which required only a single connection. As illustrated, a flange 24 is provided on the tank into which the connection 16 is threadedly secured.

For initial operation of the system, priming water must be provided, the most satisfactory method being to fill the tank to a level about equal with that of the partition 27 or slightly higher, as indicated at 28. With the impeller operating, the water flows through the priming passage 29 and 13 thence through the jet 20 into the intake chamber 21 and is therefrom drawn and forced through the impeller into the discharge passage 12 and 30 into the tank, simultaneously creating suction in the suction line 23 to lift the water from the source, and forcing some of the air from the intake chamber and suction line into the tank.

This operation continues in surges until the water has been lifted through the suction line after which water from the suction line and from the priming passage pass simultaneously to the impeller and thence to the tank 15, gradually building up the pressure in the tank 15, the mixture of water and air being delivered through the upper passage 30, while the air-free water is delivered to the pump through the lower passage 29.

As the pressure builds up in the tank, the water is delivered through the jet 20 under increasing pressure to boost the discharge pressure, until it eventually reaches the stage where the jet will lift the water through the suction pipe while the pump functions to force the water under increased pressure into the tank.

After the initial operation of the pump following installation, the system stays primed and operates immediately under the influence of the jet to deliver the water at excess pressure, because the suction line and the intake chamber will be kept filled with water from the tank.

The only difference in Fig. 2 exists in the substitution of a control valve 22 for the jet 20. In this modification there is no boost in pressure. The water from the tank merely flows past the control valve 22 when the pressure in the tank is low, with the valve wide open. As the pressure in the tank increases, the pressure of the water in the passage 13 acts on the diaphragm 31, forcing it back against the urgence of the spring 32, closing the valve 22 proportionately to the existent pressure, thus controlling the volume of priming water delivered. The connections are made in the same way and the pumping system is started in the same way, and likewise, the pump stays primed.

The single connection 16 is preferred because of its simplicity and the ease with which it forms the coupling between the pump and the tank. It is possible of modification as indicated in Fig. 3 in which a first pipe 33 has one end connected with the discharge passage 12 with the other end extending into the tank, and a second pipe 34 surrounds the first pipe and forms the connection between the tank and the pump for delivering water to the pump for priming or boosting the pressure of delivery. A far less desirable method, because it would involve two separate connections to the tank, would be that of connecting the discharge and priming passages through separate pipes at different levels (not shown).

The system is provided with the conventional control mechanism for automatic operation, such as the pressure switch 35 and the float 36, the connections and operations of which are well known in the art and therefore require no further description, their functions being, to start the motor when the water in the tank drops to a predetermined level, and stop the motor when the water level has been restored in the tank.

I claim:

1. A pump casing having a priming chamber and a discharge chamber formed therein, and an upper discharge passage and a lower priming passage adjacently opening through one side wall of said casing respectively into said discharge chamber and said priming chamber with a vertical flange face formed exteriorly of said casing and surrounding said passages to function as a common connection for both passages; a utility pressure storage tank having a threaded inlet, and a connecting member threaded at one end for adjustable connection in said threaded inlet and having a flange at the other end for bolting against said vertical flange face and having an upper and a lower passage extending therethrough for completing communication between said first-mentioned upper and lower passages and the same relative levels in said tank.

2. A connection for connecting a pump having a vertical flange face on one side with an upper discharge passage and a lower booster inlet opening therethrough, with a utility pressure storage tank having a threaded inlet in the side thereof, comprising: a cylindrical member having a flange at one end for bolting against said vertical flange face and threaded at the other end for adjustable connection in said threaded inlet, and having parallel passages therethrough for completing communication respectively from said discharge passage and from said booster passage with the interior of said tank, whereby a deep-well pump having a booster jet is directly connectible through the conventional threaded inlet on a conventional utility pressure tank.

3. Means for connecting a pump having a flange face having a discharge passage and a priming or booster inlet opening therethrough, to a pressure tank having a threaded inlet, comprising: a member having a flange at one end for bolting to said flange face, and threaded at the other end for threaded connection to said threaded inlet, and having two passages formed longitudinally therethrough for completing communication respectively between said discharge passage and said tank, and between said tank and said priming or booster inlet, said threaded connection providing for adjustment of said member to bring said flange into sealing cooperation with said flange face and said two passages respectively aligned with the discharge passage and priming or booster inlet in said flange face, and providing for connection of a deep-well pump to a tank previously installed and equipped only for a shallow-well pump.

FRED A. CARPENTER.